United States Patent [19]
Baarlie

[11] Patent Number: 5,949,195
[45] Date of Patent: Sep. 7, 1999

[54] APPARATUS AND METHOD FOR EXTENDING USEFUL LIFE OF BARRICADE WARNING LIGHT

[75] Inventor: Robert A. Baarlie, Bruce, Wis.

[73] Assignee: WLI Industries, Inc., Villa Park, Ill.

[21] Appl. No.: 08/778,393

[22] Filed: Dec. 31, 1996

[51] Int. Cl.[6] .................................................. H05B 37/02
[52] U.S. Cl. ........................................ 315/200 A; 331/179
[58] Field of Search ........................ 315/200 A; 331/179

[56] References Cited

U.S. PATENT DOCUMENTS

| | | | |
|---|---|---|---|
| 3,130,349 | 4/1964 | Mallory | 315/200 A |
| 3,693,110 | 9/1972 | Briggs, Jr. et al. | 331/179 X |
| 3,778,998 | 12/1973 | Berney | 331/179 X |
| 4,156,166 | 5/1979 | Shapiro et al. | 315/200 A X |

FOREIGN PATENT DOCUMENTS 54-16866  2/1979  Japan ............................... 315/200 A

*Primary Examiner*—Justin P. Bettendorf
*Attorney, Agent, or Firm*—Dick & Harris

[57] ABSTRACT

The present disclosure is directed to an apparatus for extending useful life of barricade warning light. The apparatus comprises a light source; a battery having an output voltage; and an oscillator circuit connected to the battery. The oscillator circuit drives the light source in either a first or alternate mode, wherein the first mode the light source flashes within a desired flasher frequency range and the alternate mode the light source is continually illuminated. The oscillator biased such that the oscillator circuit automatically switches from the first mode into the alternate mode at an optimal value for the battery output voltage. A method for extending useful life of barricade warning light is also disclosed.

8 Claims, 1 Drawing Sheet

APPARATUS AND METHOD FOR EXTENDING USEFUL LIFE OF BARRICADE WARNING LIGHT

BACKGROUND OF THE INVENTION

1. Field of the Invention

The present invention relates to battery operated light units typically situated atop barricades placed along the road-side to mark construction zones, road hazards or to otherwise warn passing motorists. More particularly, the present invention is directed to an apparatus and method for extending the useful life of the batteries powering the light unit.

2. Background Art

Barricade mounted warning light units are required to be used in virtually every road construction project to alert motorists generally to the presence of the construction zone and particularly to the presence and location of a specific hazard. Typically when on, these light units operate in either a "steady burn" mode or in a flashing mode. In the flashing mode, circuitry driving the light source causes the light to repeatedly turn on and off at a desired rate typically between 55 and 75 times per minute. In the "steady burn" mode, in order to prolong battery life, the light source is not truly constantly on, but rather, the light source is driven by circuitry which flashes the light unit on and off very rapidly. The frequency of the flash rate is in fact so high that the flashing light is perceived by the human eye to be a constantly illuminated light.

In many states, municipalities, counties and other governmental entities have laws and/or regulations which govern the operation of these illuminated barricades. Many entities, if not all, require that the light atop the barricades operate from at least dusk to dawn. Other regulations require that the light, when in flash mode, flash at a certain rate, such as between 55 and 75 times per minute. Other requirements are directed to the minimum lumens (or candles) of illumination output by the light unit as well as the direction of diffusion of the light emitted.

As with any battery-operated device, it is known that after a certain length of use the battery will be depleted and the device will no longer operate. In a lighting application it might be assumed that the light unit will remain lit until all of the battery energy is exhausted with, however, a decrease in light output corresponding to a decrease in battery voltage. In fact, in most instances where electronic circuitry is controlling the operation of the light, a certain minimum voltage is required to operate the control circuitry itself. When the battery energy falls below a certain voltage the control circuitry will cease to operate and the light will no longer function necessitating replacement of the battery. However, it is noted that in many cases when the light has ceased to function there does in fact remain useful energy in the batteries removed from such barricade light units. In addition to wasting money by prematurely disposing of otherwise useful batteries, a worn-down battery and non-functioning warning light may lead to a hazardous condition where passing motorists are unable to see the warning barricade and as a result are injured resulting in potential legal liability to the barricade owner/operator.

Accordingly, it is an object of the present invention to provide an apparatus and method for extending useful life of the barricade warning light unit.

It is an associated object of the present invention to provide a warning light which automatically switches from a flashing or "steady burn" mode of operation to a constant on mode of operation.

These and other objects of the present invention will become apparent in light of the present specification, claims and drawings.

SUMMARY OF THE INVENTION

The present invention is directed to an apparatus for extending useful life of a barricade warning light. This apparatus comprises a light source; a battery having an output voltage; and an oscillator circuit connected to the battery. The oscillator circuit drives the light source in either a first mode or a second mode. In the first mode the light source operates in as a "steady burn" light where the frequency of the flash rate is within a desired flasher frequency rate that is so high that the flashing light is perceived by the human eye to be a constantly illuminated light. In the second mode the light source operates as a flashing light where the frequency of the flash rate is within a desired flasher frequency rate that is perceivable to the human eye. The oscillator circuit including means for biasing the circuit such that the circuit automatically switches from either first or second modes into an alternate mode at a predetermined battery voltage. This optimization assists users of the barricade warning light in that the switch between first or second modes to an alternate mode precludes a condition which occurred in prior art barricade warning lights wherein the battery could no longer visibly drive the light source in a flashing mode, but still could have visibly driven the light source in a true constant burn. Thus, by optimizing the biasing the light source is automatically switched between visibly working modes, thus, precluding premature disposal of the battery.

In some embodiments of the present invention, the apparatus may further include a switch that selects between the first and second modes of operation. This switch may comprise a reed switch or other form of manually operated switch.

Thus, the present invention presents a method for extending useful life of a barricade warning light, by taking the following steps: driving the light source in one of a first and alternate mode, wherein the first mode causes the light source to flash within a desired flasher frequency range and the alternate mode causes the light source to be continually illuminated; automatically switching from the first to the alternate mode upon the battery output voltage dropping to a predetermined level; and selecting discrete components for inclusion in the oscillator circuit such that the step of switching occurs at an optimal value for said battery output voltage. This method may further include the step of selecting discrete components which sets the optimal value at a voltage sufficient to still drive the light source in the first mode yet proximate the level at which driving the light source in the first mode would be impossible.

BEST MODE FOR PRACTICING THE INVENTION

Figure 1:
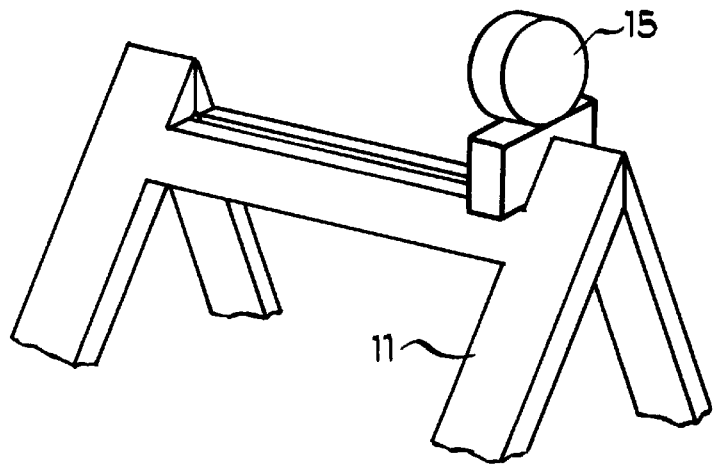
FIG. 1 of the drawing is a perspective view of a barricade having a battery-powered light.

While this invention is susceptible of embodiment in many different forms, there is shown in the drawings and will herein be described in detail, one specific embodiment with the understanding that the present disclosure is to be considered as an exemplification of the principles of the invention and is not intended to limit the invention to the embodiment illustrated.

Figure 2:
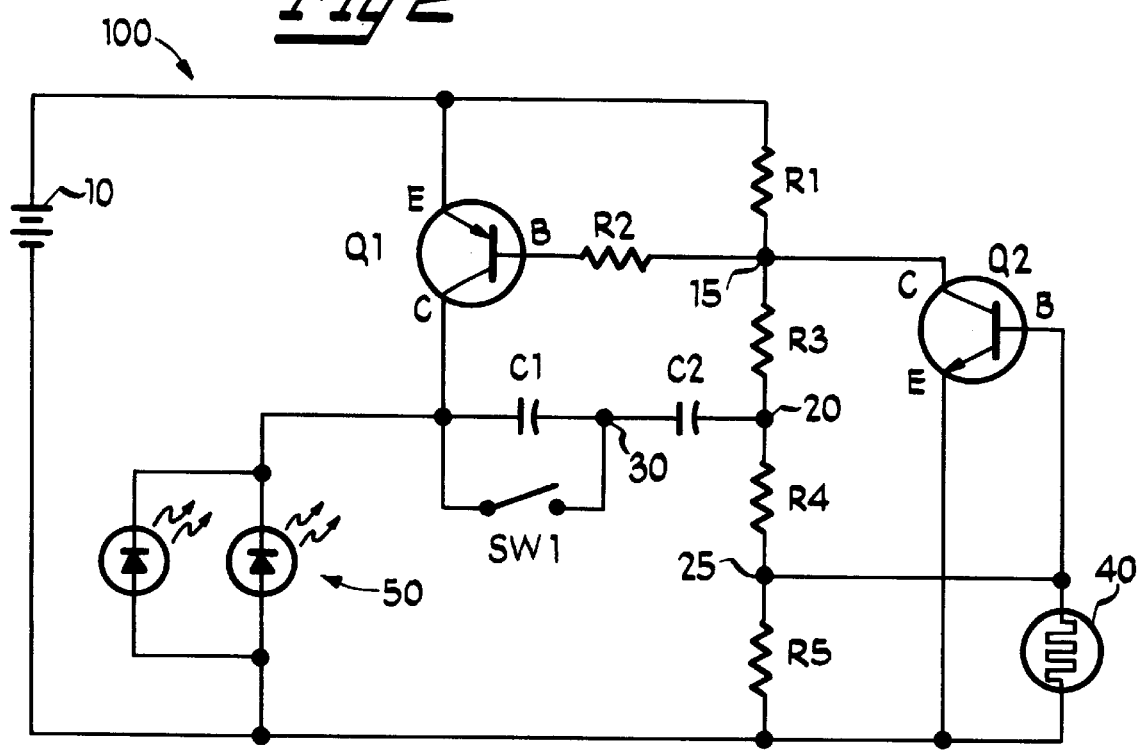
FIG. 2 of the drawings is a schematic diagram of one preferred embodiment embodying the teachings of the present invention.

FIG. 1 of the drawing is a perspective view of barricade 11 having battery-powered light 15 mounted thereto. A schematic diagram of one preferred embodiment of the circuitry enclosed within battery-powered light 15 is shown in FIG. 2. This circuit is but one implementation of the principles which embody the teachings of the present invention.

Circuit 100 is powered by battery 10. It is contemplated that battery 10 will comprise one or more standard disposable dry-cell batteries because they are relatively inexpensive and, as used within circuit 100, will normally last for months. However, it is deemed within the scope of the present invention to use rechargeable batteries in place of conventional dry-cells. As is generally known, no matter which type of battery is used, the voltage output by battery 10 will diminish through continued use in driving circuit 100 and specifically light source 50. Battery 10, which (in a preferred embodiment) is nominally 3 volts, should ideally be usable within circuit 100 until it is completely "dead" (defined by the battery industry as 0.9 volts per cell and in the present case, 1.8 volts for a 3 volt battery). The present circuit is also useable in a 6 volt powered circuit with an appropriate adjustment to the component values.

The negative terminal of battery 10 is connected to ground. The positive terminal of battery 10 is connected to the emitter of transistor Q1 and a first terminal of resistor R1. The second terminal of resistor R1 (at node 15) is connected to a first terminal of resistor R2, a first terminal of resistor R3 and the collector of transistor Q2. The second terminal of resistor R2 is connected to the base of transistor Q1 to limit the current thereto. The emitter of transistor Q2 is connected to ground.

At node 20, the second terminal of resistor R3 is connected to a first terminal of capacitor C2 and a first terminal of resistor R4. The second terminal of capacitor C2 is connected at node 30 to a first terminals of capacitor C1 and switch SW1. The second terminals of capacitor C1 and switch SW1 are connected to the collector of transistor Q1 and a positive terminal of light source 50. The negative terminal of light source 50 is connected to ground. The second terminal of resistor R4 is connected to the first terminal of resistor R5 and the base of transistor Q2 at node 25. The second terminal of resistor R5 is connected to ground.

Circuit 100 operates as both a "steady burn" and as a light flasher circuit. As can be seen, when switch SW1 is in an open position the circuit will drive the light source in a "steady burn" mode where the light flashes on and off very rapidly, so rapidly in fact as to be perceived by the human eye as being continuously on. When switch SW1 is in a closed position the circuit will drive the light source 50 in a true flashing mode.

However, as noted above, there is an operating point where battery-powered light flasher circuits cease to function. Unfortunately, this condition was reached in prior art circuits before battery 10 was complete "dead," as defined by the industry. This wasteful situation results from the inability of the nearly-dead battery to provide sufficient voltage to drive the circuit to facilitate flashing of the light source 50. However, a nearly-dead battery is still able to power light source 50 in a continually illuminated mode.

Thus, it is an object of the present invention to select components such that the circuit "automatically" switches from either a first (steady burn—rapid flashing) mode or a second (flashing) mode to an alternate (constant burn) mode immediately prior to reaching a battery output voltage level at which battery 10 can no longer drive light source 50 in either the steady burn or flashing mode. In a preferred embodiment of the invention this is achieved with the following component values:

Nominal Voltage of Battery: 3 volts;
R1: 3.3 KiloOhms;
R2: 120 Ohms;
R3: 27 KiloOhms;
R4: 220 Ohms;
R5: 150 KiloOhms;
C1: 0.022 microfarads;
C2: 100 microfarads;
LEDs 1 and 2: 30 degree angle by Hewlett-Packard;
Q1: 2N5354 (or 2N5366); and
Q2: 2N3394.

With the foregoing component values the switch from the first mode to the alternate mode occurs when the battery voltage drops to approximately 2.25 volts. When light supply is switched from the first mode to the alternate mode the light will actually be brighter to the human eye since the voltage applied to light supply 50 will be greater and the current draw larger given that portions of the circuitry, and the inherent voltage drop and energy consumption, are omitted. Further, a light unit which has switched to the alternate mode of operation will be observable to the operator who will be able to detect that the particular light unit is operating brighter than normal which in turn signals to the operator that the battery of that particular light unit will soon need to be replaced.

The switch from the second mode to an alternate mode occurs when the battery voltage drops to approximately 2.10 to 2.13 volts. It is noted that when the voltage has dropped and prior to switching from the second mode to the alternate mode the light supply 50 will still be flashing at a rate of 56 flashes per minute but will have a significantly longer "on time" than normal. When light supply is switched from the second mode to the alternate mode the light will also be brighter to the human eye, though not as bright as a unit which is switched from the first mode to the alternate mode since less energy will be available in the battery at the time the switching occurs.

Of course, other values for the foregoing components can be selected. These new values should be selected with certain rules in mind. The values of R3 and C2 control the flash rate of light source 50. As noted, in many government regulations require this rate to be between 55–75 cycles per minute. For the values set forth above, light supply 50 flashes 65 times per minute for 104 milliseconds per flash when battery 10 is at 3 volts.

Ideally, light supply 50 is controlled by a square voltage wave. This is desirable because it is unlikely that light supply 50 will be driven by the voltage levels during the ramp-up to the maximum voltage. Thus, the quicker the rise time, the more efficient the use of battery power as the maximum amount of power is used to actually light light supply 50. Resistor R2 controls the rise rate of the leading edge of the square wave, such that the smaller the value for resistor R2, the shorter the rise-time. However, resistor R2 must still be sufficiently large to protect the base of transistor Q1.

The length of time during which light supply 50 is illuminated is controlled by the value of resistor R4 and capacitor C2. Finally, resistor R5 should remain large to facilitate appropriate operation of circuit 100 at extreme temperatures, such that circuit 100 remains capable of operation between minus 20 to 150 degrees Fahrenheit.

Of course, as is readily understood to those of ordinary skill in the art the values of each component are mutually dependent upon one another for the operation of the circuit. As would be readily understood by one of ordinary skill in the art with the present specification and drawings before them, these values can change as a function of one another so long as the light output and operation parameters are within required ranges.

In a preferred embodiment, circuit 100 further includes photo-detector 40 which is also connected to node 25 to prevent light source 50 from being actuated during day-light situations. In this embodiment, component value selection is performed to insure that appropriate biasing of photo-detector 40 is maintained.

The foregoing description and drawings merely explain and illustrate the invention, and the invention is not limited thereto except insofar as the appended claims are so limited, as those skilled in the art who have the disclosure before them will be able to make modifications and variations therein without departing from the scope of the invention.

What is claimed is:

1. An apparatus for extending useful life of barricade warning light comprising:

a light source, a battery having an output voltage; and an oscillator circuit connected to said battery, said oscillator circuit driving said light source in one of a first and second mode, said first mode causes said light source to flash within a desired flasher frequency range, said second mode causes said light source to flash at a high rate so as to appear as if said light source is continually illuminated, said oscillator circuit including means for biasing said oscillator circuit such that said oscillator circuit automatically switches from said first mode into said second mode at an optimal value for said battery output voltage.

2. The apparatus according to claim 1 wherein said oscillator circuit drives said light source in a second mode wherein said light source flashes at a second desired flasher frequency rate, said apparatus further comprises a switch that selects between the first and second modes of operation.

3. The apparatus according to claim 2 wherein said switch comprises a reed switch.

4. A method for extending useful life of barricade warning light, the barricade warning light including a light source, a battery having an output voltage, and an oscillator circuit connected to the battery, the method comprising the steps of:

driving the light source in one of a first and second mode, wherein the first mode causes the light source to flash within a desired flasher frequency range and the second mode causes the light source to flash at a high rate so as to appear as if said light source is continually illuminated;

automatically switching from the first to the second mode upon the battery output voltage dropping to a predetermined level; and selecting discrete components for inclusion in the oscillator circuit such that the step of switching occurs at an optimal value for said battery output voltage.

5. The method according to claim 4 wherein the step of selecting discrete components sets the optimal value at a voltage sufficient to still drive the light source in the first mode yet proximate the level at which driving the light source in the first mode would be impossible.

6. An apparatus for extending useful life of barricade warning light comprising:

a battery having an output voltage;

a light source powered by said battery; and an oscillator circuit connected to said battery, said oscillator circuit driving said light source in one of a first and second mode, wherein said first mode causes said light source to flash within a desired flasher frequency range, and said second mode causes said light source to be continually illuminated, said oscillator circuit including means for biasing said oscillator circuit such that said oscillator circuit automatically switches from said first mode into said second mode at an optimal value for said battery output voltage.

7. The apparatus according to claim 6 wherein said oscillator circuit drives said light source in a third mode wherein said light source flashes at a second desired flasher frequency rate, said apparatus further comprises a switch that selects between the first and third modes of operation.

8. The apparatus according to claim 7 wherein said switch comprises a reed switch.

* * * * *